May 31, 1927.
B. F. JANCKE
1,630,435
ELECTRIC MASSAGE MACHINE
Filed May 18, 1925      3 Sheets-Sheet 3
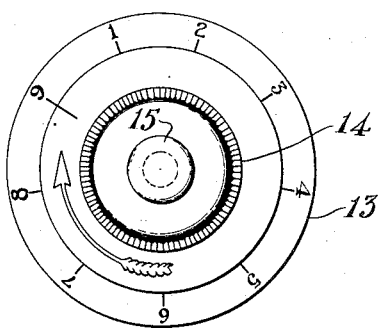
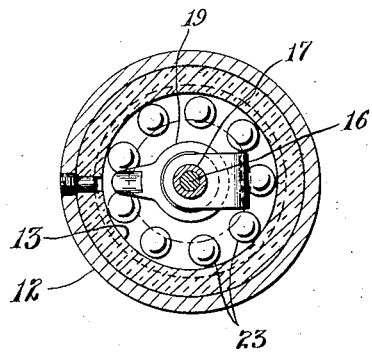
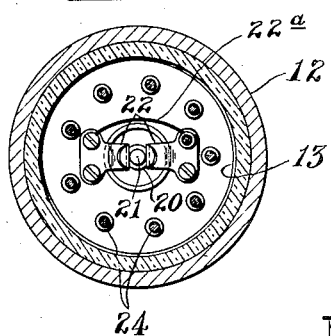
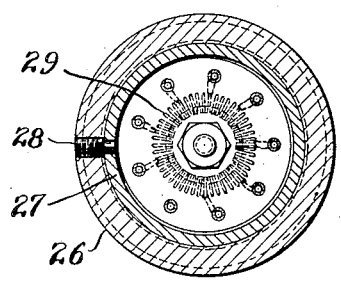
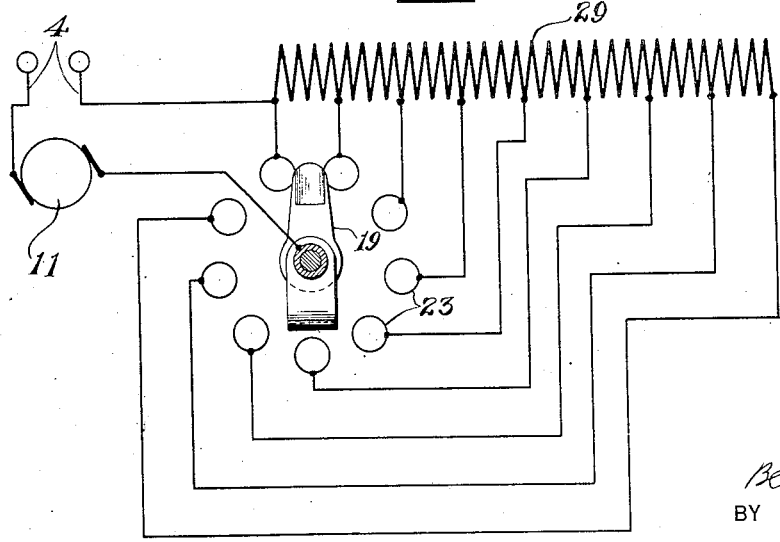
INVENTOR
Benno F Jancke
BY
Mock Blum
ATTORNEYS

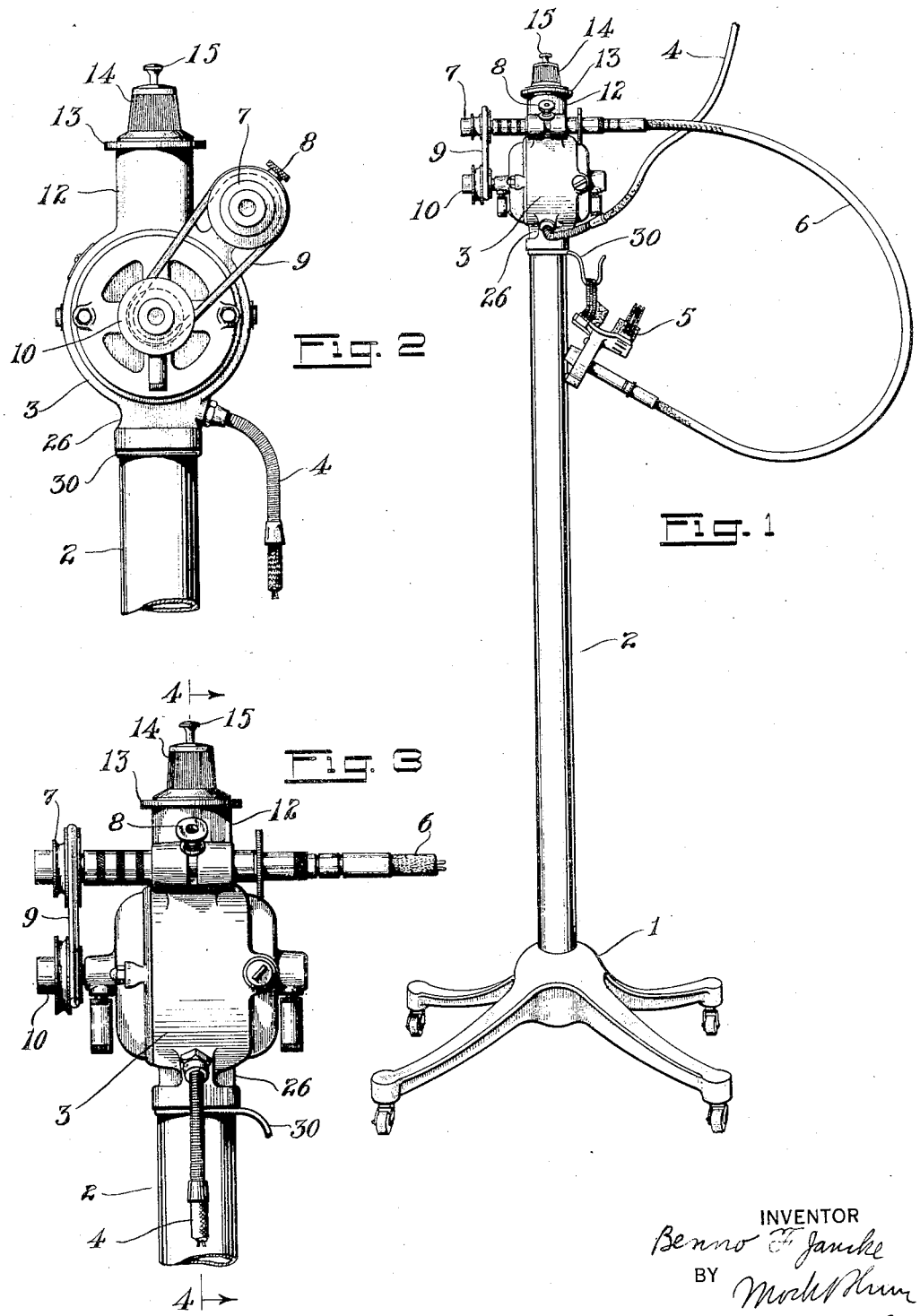

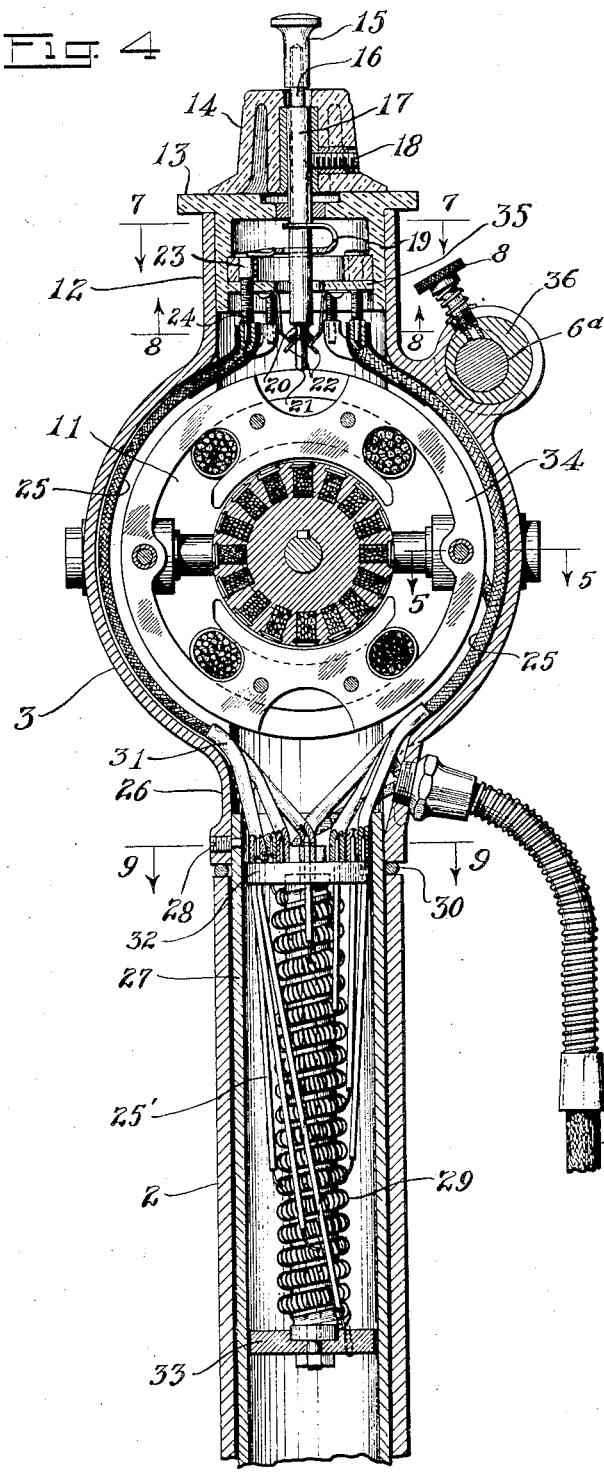
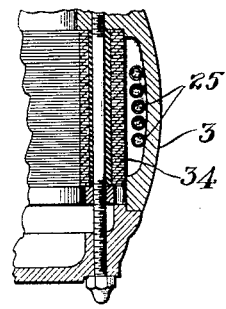

Patented May 31, 1927.

1,630,435

UNITED STATES PATENT OFFICE.

BENNO F. JANCKE, OF NEW YORK, N. Y., ASSIGNOR, BY MESNE ASSIGNMENTS, TO HALLIWELL-SHELTON ELECTRIC CORPORATION, OF NEW YORK, N. Y., A CORPORATION OF NEW YORK.

ELECTRIC MASSAGE MACHINE.

Application filed May 18, 1925. Serial No. 30,893.

My invention relates to a new and improved electric massage machine.

One of the objects of my invention is to provide a massage machine of compact and ornamental appearance.

Another object of my invention is to provide an electric massage machine having a motor which can be run at many different speeds.

Another object of my invention is to provide an electric massage machine having a motor whose speed can be regulated by a rheostat which is located in the supporting column of the machine.

Another object of my invention is to provide an electric massage machine having an electric motor whose regulation can be very simply and efficiently accomplished by the operator.

Another object of my invention is to provide an electric massage machine in which the electric motor is mounted upon a column, the regulating rheostat for said motor being located in said column below the motor and the regulating switch for regulating the speed of said motor being located above the motor and the casing provided therefor.

Other objects of my invention will be set forth in the following description and drawings, which illustrate a preferred embodiment thereof, it being understood that the above mentioned general statement of the objects of my invention is intended merely to generally explain the same and not to limit it in any manner.

Fig. 1 is a perspective view.

Fig. 2 is a detail side elevation showing the top of the column, the motor casing and the driving and driven pulley.

Fig. 3 is an end elevation showing substantially the same parts depicted in Fig. 2.

Fig. 4 is a sectional view on the line 4—4 of Fig. 3.

Fig. 5 is a sectional view on the line 5—5 of Fig. 4.

Fig. 6 is a top view of Fig. 2 showing the scale for the regulating member.

Fig. 7 is a section on the line 7—7 of Fig. 4.

Fig. 8 is a section on the line 8—8 of Fig. 4.

Fig. 9 is a section on the line 9—9 of Fig 4.

Fig. 10 is a detail diagrammatic view of the electrical connections and rheostat for regulating the speed of the motor.

The device is provided with an ordinary pedestal 1 and a column 2.

As shown in Fig. 4, the top of the column 2 is provided with an inner sleeve 27 which is connected to the motor casing or housing by means of a shouldered set screw 28. The motor casing 3 has a lower extension 26 which rests upon a wire ring 30 located at the top of the column 2 so that the motor casing 3 can be freely turned about a vertical axis. As shown in Fig. 1, the supporting ring 30 is extended so as to form a hook from which the massage implement 5 at the end of the ordinary flexible transmission shaft 6 can be supported by means of a suitable loop shown in Fig. 1 and which is made of a continuous spiral spring so that it also serves for admitting the hand of the operator when the machine is in use.

The motor casing 3 is provided with an upper extension 12 and the manually operated means or switch for regulating the speed of the motor fit into the top extension 12.

The electric motor 11, which may be of any suitable type, is located within the casing 3. I have not described in detail the armature and field winding or other parts of the motor 11 because, as before stated, any suitable type of motor may be employed for this purpose.

The motor 11 is provided with a regulating rheostat 29 which consists of a tapped spiral coil of suitable resistance wire wound around a central insulating mandrel which is connected to a suitable base 33.

A number of leads 25 tap the resistance coil 29 at a series of separated points thereof. These leads may be of any suitable number, and nine (9) of them are used in this embodiment. The said lead wires 25 pass through suitable insulating sleeves 31 at the bottom of the casing 3 and they are then soldered or otherwise suitably connected to their lower extensions 25′ which are directly connected to the resistance coil 29. The connection between the leads 25 and their extensions 25′ are made at an upper insulating support 32 which, like the mandrel or core of the rheostat and the base 33, may be of any suitable insulating material.

As shown in Fig. 5 the leads 25 pass through a cored recess in the motor housing 3 separated from the rest of the motor casing by the field plates 34 of the motor so that the said lead wires 25 are kept in proper position in the motor casing.

Near the top of the motor casing 3 each of the leads 25 is soldered to a metal tap 24, the joint being suitably insulated. Each said metal tap 24 has an externally threaded shank and a head 23 and each said metal tap 24 is threaded through an insulating plate 35 and is held in place by its enlarged head 23. The apparatus therefore has nine taps whose heads 23 are suitably insulated from each other.

The top extension 12 of the casing 3 is closed by a cap 13 made of insulating material, and the insulating support 35 is pressed into the said cap 13. The shouldered portion of the cap 13 is provided with the numerals 1—9 shown in Fig. 6, and these numerals designate the nine divisions of a suitable scale.

The switch device comprises a metal tube 17 to which a set screw 18 is connected. The set screw 18 is located in a recess of the revoluble finger piece 14 which rests upon the cap 13. Hence, the finger piece 14 and the tube 17 can be freely turned together. A metal plunger 16 is located within the tube 17 and the bottom of the plunger 16 is provided with a button 20 made of insulating material through which the metal end 21 of the plunger 16 projects.

One of the line terminals 4 is connected directly to the top of the resistance coil 29, as diagrammatically shown in Fig. 10. The top of the said resistance coil is also connected to the last tap 23, which corresponds to the position of the regulating switch in which the motor is run at highest speed. The other terminal 4 is connected to one of the motor brushes, and the other motor brush is connected to one of the springs 22. These springs 22 are connected by a wire 22ª, and each of said springs is connected to the insulating plate 35 by a rivet, independently of the taps 24. Hence, when the plunger 16 is in its upper position, as shown in Fig. 4, both springs 22 serve to connect the second motor brush to the metal end 21 of plunger 16 and to tube 17 and contact shoe 19. When the plunger 16 is in its lower position, then the springs 22 contact with the insulating member 20 so that the second motor brush is no longer electrically connected to plunger 16 and tube 17. The springs 22 serve to hold the plunger 16 in the upper and lower positions thereof.

Hence, if the parts are in the position shown in Fig. 4 in which both contact springs 22 are in contact with the end 21 of the plunger 16, then the motor can be operated at various speeds by revolving the finger piece 14 and its associated parts, as will be later explained in more detail. However, if the plunger 16 is depressed by pressing upon the head 15 thereof, so that the insulating button 20 separates and remains in contact with the springs 22, then the line circuit is broken and although the finger piece 14 can be revolved, this will not switch the line current through the motor.

Hence, the operation of the machine can be interrupted by merely downwardly pressing the plunger 16.

The metal tube 17 is provided with a bent resilient contact shoe 19 and as shown in Fig. 4 the tube 17 extends to the upper branch of the contact shoe 19 and the contact shoe 19 is brazed or otherwise suitably secured to the end of the tube 17. The plunger 16 is enlarged directly adjacent the bottom of the upper part of the contact shoe 19 and it passes freely through the lower part of the said contact shoe 19. Hence, when the finger piece 14 is turned, this causes the tube 17 and the contact shoe 19 to be simultaneously turned while the plunger 16 can remain at rest, dependent upon the tightness with which the plunger 16 fits within the tube 17. The head of the contact shoe 19 passes over the ends 23 of the respective taps so that as shown diagrammatically in Fig. 10 the motor can be operated at nine separate speeds. The line terminals 4 are diagrammatically depicted in Fig. 10 and they are also shown in Figs. 2 and 4, for example.

The armature shaft of the motor has a double or reduction pulley 10 secured thereto and this reduction pulley 10 has two separate pulley sections, the respective diameters of which have the proportion of 1 to 2;

The flexible shaft 6 of the vibrator, which is of the ordinary type, is connected in the ordinary manner to a rod 6ª located in an eccentric bearing as shown in Fig. 4. This eccentric bearing 36 is held in place by a suitable set screw 8.

If the drive belt 9 becomes loose at any time, then the tightness thereof can be increased by merely turning the eccentric bearing 36 in a clockwise direction.

The rod 6ª is also provided with a double reduction pulley 7 having the same relative diameter as the pulley sections of the reduction pulley 10, so that by turning the bearing 36 counter-clockwise, and thereby loosening the belt 9, the belt 9 can be transferred from one pair of pulley sections to another pair thereof, so that the rod 6ª can be driven at the same speed as the armature shaft or it can be driven twice as fast. The set screw 8 is hollow, as shown, for example, in Fig. 4, and the head thereof is also hollow, so that lubricating oil can be injected to lubricate the rod 6ª.

I have not gone into certain of the constructional details of the machine where such details are in themselves old and well known, as these are not necessary for the proper understanding of my construction.

The finger piece 14, which is made of any suitable insulating material, can have a mark inscribed thereon, to serve as an index in connection with the scale shown in Fig. 6.

It is obvious that when the shoe 19 contacts with contact 1, that the motor will revolve at highest speed, and that the speed of the motor will be decreased as the finger piece 14 is revolved clockwise. The upper and lower heads 32 and 33 of the mandrel for the resistance coil are supported by the leads 25.

I have described a preferred embodiment of my invention, but it is clear that numerous changes and omissions can be made without departing from the spirit thereof.

I claim:—

1. In an electric massage machine, the combination of a hollow supporting column, a separate motor casing wider than said column and containing a motor and connected to said column, rheostat means adapted to control the speed of said motor and located in said column, a switch casing located above said column, said casing having therein a plurality of wires connected to separate sections of said rheostat means, said casing also having a movable switch member provided with an operating head extending above said column.

2. In an electric massage machine, the combination of a hollow supporting column, a separate motor casing mounted on top of said column, a switch casing located at the top of said motor casing, rheostat means adapted to control the speed of said motor and located in said column, said switch casing having therein a plurality of wires connected to separate sections of said rheostat means, said casing also having a movable switch member provided with an operating head projecting from the switch casing.

3. In an electric massage machine, the combination of a hollow supporting column, a motor casing connected to the top of said column, a switch casing located at the top of said motor casing, resistance means located below said motor casing and supported by and suspended from a plurality of leads connected to said switch casing and passing through said motor casing and connected to said resistance means, and a movable switch located in said switch casing.

4. A device according to claim 3 in which said leads pass through an enclosed chamber in said motor casing.

5. A device according to claim 3 in which said motor casing has a recess whose inner end is closed by the field plates of the motor in said casing and in which the said leads pass through said enclosed recess.

6. In an electric massage machine, the subcombination of a casing having an electric motor, the said motor having associated therewith a rheostat having sections respectively connected to leads, a switch casing having therein a plurality of wires to which said leads are respectively connected, a revoluble tubular switch member having a contact shoe adapted to contact with said taps, and a reciprocable plunger located within said switch member, said reciprocable plunger being adapted to control the connection of said motor to its power line.

In testimony whereof I affix my signature.

BENNO F. JANCKE.